United States Patent
Lin et al.

(10) Patent No.: US 11,164,534 B2
(45) Date of Patent: Nov. 2, 2021

(54) DISPLAY DEVICE

(71) Applicant: Qisda Corporation, Taoyuan (TW)

(72) Inventors: Meng-Wei Lin, Taoyuan (TW); Chih-Chieh Su, Hsinchu County (TW)

(73) Assignee: Qisda Corporation, Taoyuan (TW)

( * ) Notice: Subject to any disclaimer, the term of this patent is extended or adjusted under 35 U.S.C. 154(b) by 2 days.

(21) Appl. No.: 16/660,757

(22) Filed: Oct. 22, 2019

(65) Prior Publication Data

US 2020/0143755 A1    May 7, 2020

(30) Foreign Application Priority Data

Nov. 1, 2018  (CN) .......................... 201811293403.4

(51) Int. Cl.
*G09G 3/34* (2006.01)
*F21V 8/00* (2006.01)

(52) U.S. Cl.
CPC ........... *G09G 3/3406* (2013.01); *G02B 6/009* (2013.01); *G02B 6/0068* (2013.01); *G09G 2320/066* (2013.01)

(58) Field of Classification Search
None
See application file for complete search history.

(56) References Cited

U.S. PATENT DOCUMENTS

| | | | | |
|---|---|---|---|---|
| 2008/0112187 A1* | 5/2008 | Katsumata | ........... | G02B 6/0076 362/611 |
| 2013/0135894 A1* | 5/2013 | Kuo | ...................... | G02B 6/0038 362/606 |
| 2013/0328780 A1* | 12/2013 | Kuroki | ...................... | G09G 3/36 345/168 |
| 2014/0098563 A1* | 4/2014 | Kim | ...................... | G02B 6/0036 362/606 |
| 2020/0110214 A1* | 4/2020 | Son | ...................... | G02B 6/0076 |

FOREIGN PATENT DOCUMENTS

| | | | |
|---|---|---|---|
| CN | 102013232 A | 4/2011 | |
| CN | 102644879 A | 8/2012 | |
| KR | 101879715 B1 * | 7/2018 | ............. G02F 1/133 |

OTHER PUBLICATIONS

Office action of counterpart application by SIPO dated Apr. 27, 2020.

* cited by examiner

*Primary Examiner* — Krishna P Neupane (57) ABSTRACT

A display device including a display panel, a light guide plate and a light emitting module is disclosed. The light guide plate is opposite to the display panel and has a light incident surface. The light emitting module emits a light to the light incident surface. The light emitting module includes a substrate, multiple first light emitting elements and multiple second light emitting elements. The first light emitting elements are disposed on the substrate along the first direction and divided into multiple first luminous areas. Each first luminous area includes at least two first light emitting elements. The second light emitting elements are disposed on the substrate along the first direction and divided into multiple second luminous areas. Each second luminous area includes at least two second light emitting elements. The first and second luminous areas are staggered along the second direction perpendicular to the first direction.

22 Claims, 6 Drawing Sheets

DISPLAY DEVICE

This application claims the benefit of People's Republic of China application Serial No. 201811293403.4, filed on Nov. 1, 2018, the subject matter of which is incorporated herein by reference.

BACKGROUND OF THE INVENTION

Field of the Invention

The invention relates in general to a display device, and more particularly to a display device capable of increasing the contrast of the main display image.

Description of the Related Art

In the related art, the display device includes a display panel and a light source module. The light source module includes multiple light emitting elements. Normally, when the display panel displays an image, all light emitting elements of the light source module illuminate. However, under the full illumination method, the main display image of the display surface will have a low contrast and the color and/or brightness cannot be highlighted.

Therefore, it has become a prominent task for the industries to provide a new design of display device to overcome the above drawbacks.

SUMMARY OF THE INVENTION

The invention is directed to a display device capable of increasing the contrast of the main display image.

According to one embodiment of the present invention, a display device is provided. Multiple luminous areas of the display device can be controlled to illuminate independently, and all light emitting elements in the same luminous area can be controlled to or not to illuminate simultaneously. In an embodiment, along with the dynamic change of the image, the controller can control a plurality of first luminous areas and a plurality of second luminous areas to change the luminous areas (for example, some luminous areas illuminate but some others do not) to enhance the contrast level of the image displayed on the display surface. Moreover, static images can be displayed by the likes of the above display method. Additionally, the luminous areas on different rows can partly overlap along the second direction, or the position between two adjacent luminous areas on the same row corresponds to the position between two adjacent luminous areas on another row. In another embodiment, the length of each of the second luminous areas is shorter than that of the first luminous areas, and the second luminous areas have a quantity greater than that of the first luminous areas. Therefore, detailed regions of the image, such as the edge of the image, can be illuminated by controlling suitable position of the second luminous areas to illuminate.

The above and other aspects of the invention will become better understood with regard to the following detailed description of the preferred but non-limiting embodiment (s). The following description is made with reference to the accompanying drawings.

DETAILED DESCRIPTION OF THE INVENTION

For the objects, structures and technical features of the present invention to be clearly understood, a number of exemplary embodiments are disclosed below with detailed descriptions.

Figure 1A:
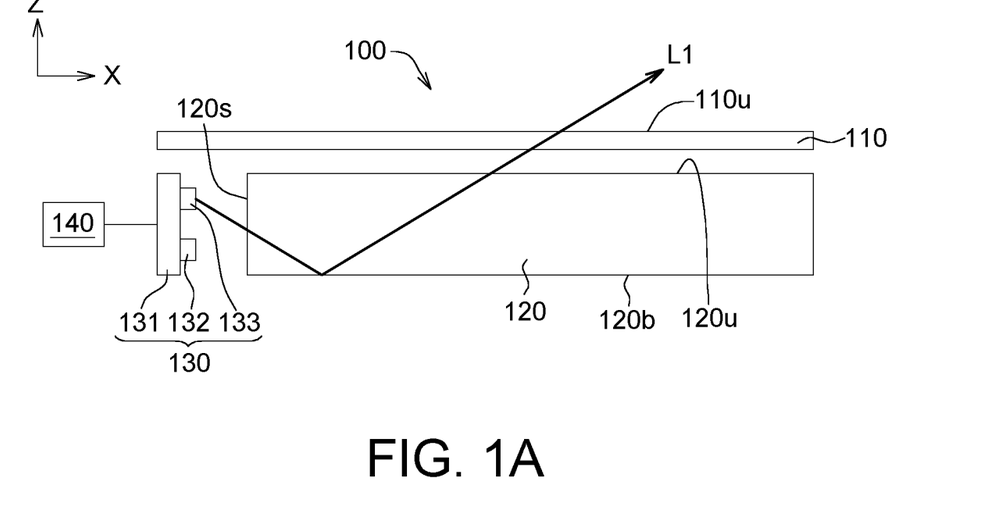
FIG. 1A is a schematic diagram of a display device according to an embodiment of the present invention.
Figure 1B:
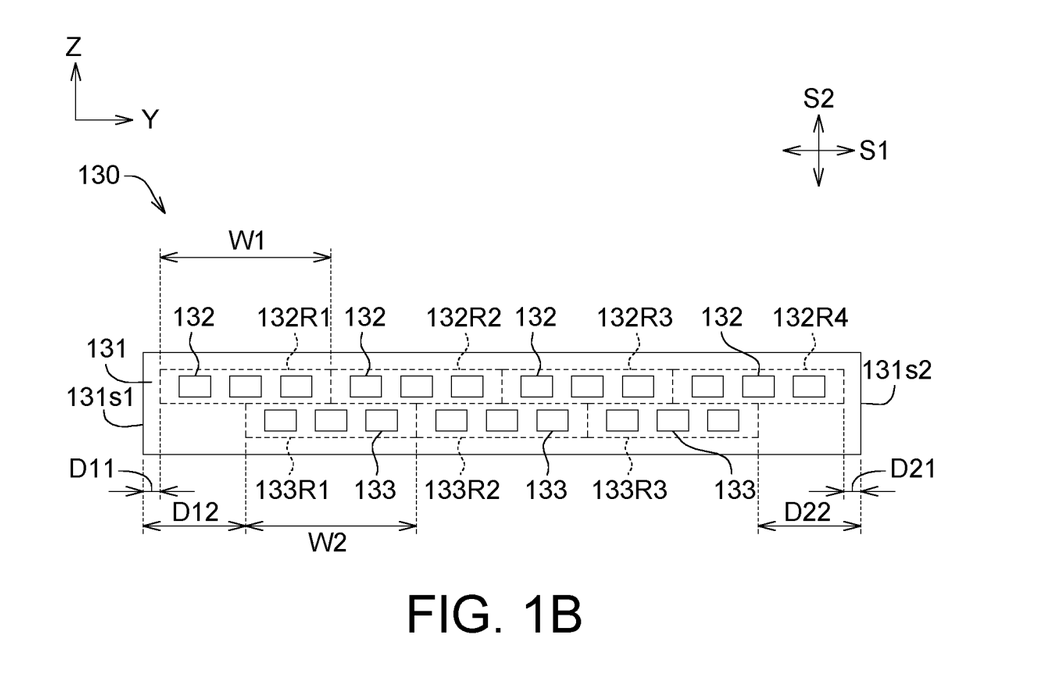
FIG. 1B is a schematic diagram of a light emitting module of the display device of FIG. 1A.

FIG. 1A is a schematic diagram of a display device 100 according to an embodiment of the present invention. FIG. 1B is a schematic diagram of a light emitting module 130 of the display device 100 of FIG. 1A.

The display device 100 includes a display panel 110, a light guide plate 120, a light emitting module 130 and a controller 140. The light guide plate 120 is opposite to the display panel 110 and has a light incident surface 120s. The light guide plate 120 and the light emitting module 130 form at least a portion of the backlight module. In the present embodiment, the backlight module is exemplified by a side-light backlight module, therefore the light incident surface 110s is a lateral side of the light guide plate 120. The light guide plate 120 further has a light outgoing surface 120u and a reflective surface 120b opposite to the light outgoing surface 120u, wherein the light incident surface 120s is extended between the light outgoing surface 120u and the reflective surface 120b. The display panel 110 and the light outgoing surface 120u are disposed in parallel equivalently or substantially.

The light emitting module 130 is configured to emit a light L1 to the light incident surface 120s. The light L1 inside the light guide plate 120 is guided to exit via the light outgoing surface 120u of the light guide plate 120. After the light L1 exits via the light outgoing surface 120u, the light L1 enters the display panel 110.

The light emitting module 130 includes a substrate 131, a plurality of first light emitting elements 132 and a plurality of second light emitting elements 133. The first light emitting elements 132 are disposed on the substrate 131 along a first direction S1, wherein the first direction S1 is an extending direction of the long side of the substrate 131 such as the Y-axis direction of FIG. 1B. The first light emitting elements 132 are divided into a plurality of first luminous areas. As indicated in FIG. 1B, the first light emitting elements 132 are divided into four first luminous areas 132R1-132R4, wherein each of the first luminous areas includes at least two first light emitting elements 132. In the present embodiment, each of the first luminous areas includes three first light emitting elements 132. The first light emitting elements 132 in the same first luminous area simultaneously illuminate or do not illuminate. The length W2 of each of the first luminous areas along the first direction S1 depends on the quantity of the first light emitting elements 132 included therein, and is not subjected to specific restrictions in the present invention. In the present invention, the boundary range of each of the first luminous areas is greater than the physical boundary range of the first light emitting elements 132 included in each of the first luminous areas. Specifically, the boundary of the boundary range of each of the first luminous areas and the boundary of the first light emitting elements 132 included in each of the first luminous areas are separated by a first interval, wherein the first interval is greater than 0. In other embodiments, the boundary of the boundary range of each of the first luminous areas can flush with the boundary of the first light emitting elements 132 included in each of the first luminous areas. Besides, any two first luminous areas can have an identical length W1 or different lengths W1 along the first direction S1.

A plurality of second light emitting elements 133 are disposed on the substrate 131 along the first direction S1 and are divided into a plurality of second luminous areas. As indicated in FIG. 1B, the second light emitting elements 133 are divided into three second luminous areas 133R1-133R3, wherein each of the second luminous areas includes at least two second light emitting elements 133, and the second light emitting elements 133 on the same second luminous area simultaneously illuminate or do not illuminate. The length W2 of each of the second luminous areas along the first direction S1 depends on the quantity of the second light emitting elements 133 included therein, and is not subjected to specific restrictions in the present invention. In the present invention, the boundary range of each of the second luminous areas is greater than the physical boundary range of the second light emitting elements 133 included in each of the second luminous areas. Specifically, the boundary of the boundary range of each of the second luminous areas and the boundary of the second light emitting elements 133 included in each of the second luminous areas is separated by a second interval, wherein the second interval is greater than 0. In other embodiments, the boundary of the boundary range of the second luminous areas can flush with the boundary of the second light emitting elements 133 included in each of the second luminous areas. Besides, any two of the second luminous areas can have an identical length W2 or different lengths W2 along the first direction S1.

In the present embodiment, the length W1 of one of the first luminous areas (such as any first luminous area) along the first direction S1 and the length W2 of one of the second luminous areas (such as any second luminous area) along the first direction S1 can be identical. For example, the length W1 of the first luminous area 132R1 along the first direction S1 and the length W2 of the second luminous area 133R1 along the first direction S1 are identical equivalently or substantially. In another embodiment, the length W1 of one of the first luminous areas along the first direction S1 and the length W2 of one of the second luminous areas along the first direction S1 can be different. For example, the length W1 of one of the first luminous areas is greater than or is less than the length W2 of one of the second luminous areas.

The second luminous areas and the first luminous areas are staggered with each other along a second direction S2. In the present embodiment, the second direction S2 is perpendicular to the first direction S1 and is such as the Z-axis direction of FIG. 1B. In another embodiment as indicated in FIG. 1B, the position of the overall second luminous areas can swap with that of the overall first luminous areas. In the present embodiment, the light emitting module 230 is exemplified by two rows of luminous areas (that is, one row of luminous areas is composed of multiple first luminous areas and the other row of luminous areas is composed of multiple second luminous areas). In other embodiments, the light emitting module 230 may include more than two rows of luminous areas, wherein some rows (for example, any two rows) of luminous areas have the technical features similar to that of the first luminous areas and the second luminous areas of the present invention, or some rows of luminous areas have the technical features similar to that of the first luminous areas of the present invention and the remaining rows of luminous areas have the technical features similar to that of the second luminous areas of the present invention.

One of the second luminous areas and one of the first luminous areas partially overlap along the second direction S2. For example, the second luminous area 133R1 and the first luminous area 132R1 partially overlap along the second direction S2. The position of one of the second luminous areas corresponds to the position between two adjacent first luminous areas of the first luminous areas in the second direction S2. For example, the second luminous area 133R1 corresponds to the position between the first luminous areas 132R1 and 132R2 in the second direction S2. In the present embodiment, the central position of one of the second luminous areas corresponds to the position between two adjacent first luminous areas of the first luminous areas in the second direction S2. For example, the central position of the second luminous area 133R1 corresponds to the position between the first luminous areas 132R1 and 132R2 in the second direction S2.

As indicated in FIG. 1B, the substrate 131 has a side 131$s$1, and the first distance D11 between the side 131$s$1 and the first luminous area 132R1 closest to the side 131$s$1 among the first luminous areas is less than the second distance D12 between the side 131$s$1 and the second luminous area 133R1 closest to the side 131$s$1 among the second luminous areas 133R. The range between the side 131$s$1 and the second luminous area 133R1 closest to the side 131$s$1 among the second luminous areas 133R can dispense with other second light emitting elements 133, such that the required quantity of second light emitting elements 133 can be reduced, and the total quantity of light emitting elements of the light source module 130 can also be reduced. Since the first distance D11 is less than the second distance D12, the quantity of second luminous areas is less than that of first luminous areas. If the quantity of second light emitting elements 133 is the same in each of the second luminous areas, the quantity of first light emitting elements 132 is the same in each of the first luminous areas, and the quantity of first light emitting elements 132 in one first luminous area is equivalent to the quantity of second light emitting elements 133 in one second luminous area, then the total quantity of second light emitting elements 133 is less than that of first light emitting elements 132.

Similarly, the substrate 131 has a side 131$s$2 opposite to the side 131$s$2. The third distance D21 between the side 131$s$2 and the first luminous area 132R4 closest to the side 131$s$2 among the first luminous areas is less than the fourth distance D22 between the side 131$s$2 and the second luminous area 133R3 closest to the side 131$s$2 among the second luminous areas. In the present embodiment, the first distance D11 is equivalent to the third distance D21, but it can also be different from the third distance D21; the second distance D12 is equivalent to the fourth distance D22, but it can also be different from the fourth distance D22.

The range between the side 131$s$2 and the second luminous area 133R3 closest to the side 131$s$2 among the second luminous areas can dispense with the second light emitting elements 133, such that the required quantity of second light emitting elements 133 can be reduced, and the total quantity of light emitting elements of the light source module 130 can also be reduced. Since the third distance D21 is less than the fourth distance D22, the quantity of second luminous areas is less than that of first luminous areas. If the quantity of second light emitting elements 133 is the same in each of the second luminous areas, the quantity of first light emitting elements 132 is the same in each of the first luminous areas, and the quantity of first light emitting elements 132 in one first luminous area is equivalent to the quantity of second light emitting elements 133 in one second luminous area, then the total quantity of second light emitting elements 133 is less than that of first light emitting elements 132.

Additionally, the controller 140 is configured to: (1) control at least one of the first luminous areas 132R1-132R4 to illuminate but control the other at least one of the first luminous areas 132R1-132R4 not to illuminate; (2) control multiple first light emitting elements 132 in the at least one of the first luminous areas 132R1-132R4 to illuminate simultaneously, for example, control all first light emitting elements 132 in the at least one first luminous area to illuminate simultaneously; (3) control at least one of the second luminous areas 133R1-133R3 to illuminate but control the other at least one of the second luminous areas 133R1-133R3 not to illuminate; (4) control multiple second light emitting elements 133 in at least one of the second luminous areas 133R1-133R3 to illuminate simultaneously, for example, control all second light emitting elements 133 in the at least one second luminous area to illuminate simultaneously; and (5) control at least one of the first luminous areas 132R1-132R4 and the at least one of the second luminous areas 133R1-133R3 to illuminate simultaneously.

Additionally, the controller 140 controls, according to the display signal, at least one of the first luminous areas 132R1-132R4 and at least one of the second luminous areas 133R1-133R3 to illuminate with the first intensity, but controls the remaining of the first luminous areas 132R1-132R4 and the remaining of the second luminous areas 133R1-133R3 to illuminate with the second intensity. The at least one of the first luminous areas 132R1-132R4 and the at least one second luminous area are adjacent to each other in the first direction S1. In an embodiment, the first intensity is greater than the second intensity. For example, the first intensity refers to the light intensity not equivalent to 0, and the second intensity refers to the light intensity equivalent to 0, that is, the luminous area does not illuminate.

The processes by which the controller 140 controls image display are disclosed below with accompanying drawings FIGS. 2A to 2C.

Figure 2A:
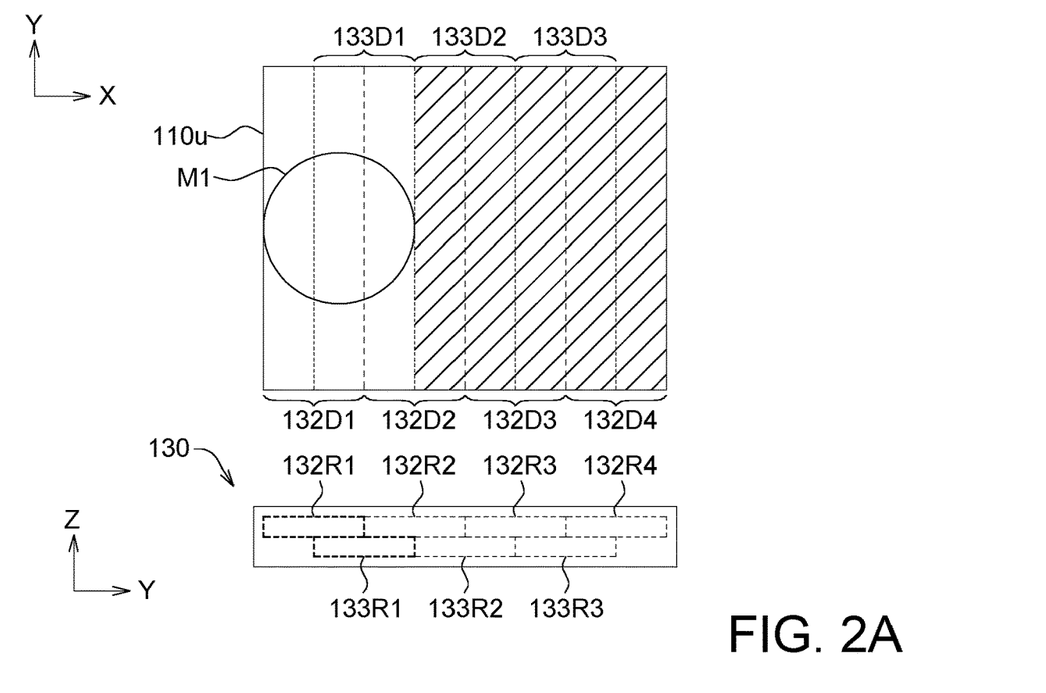
FIGS. 2A to 2C are process diagrams of an image display method of the display device of FIG. 1A.
Figure 2B:
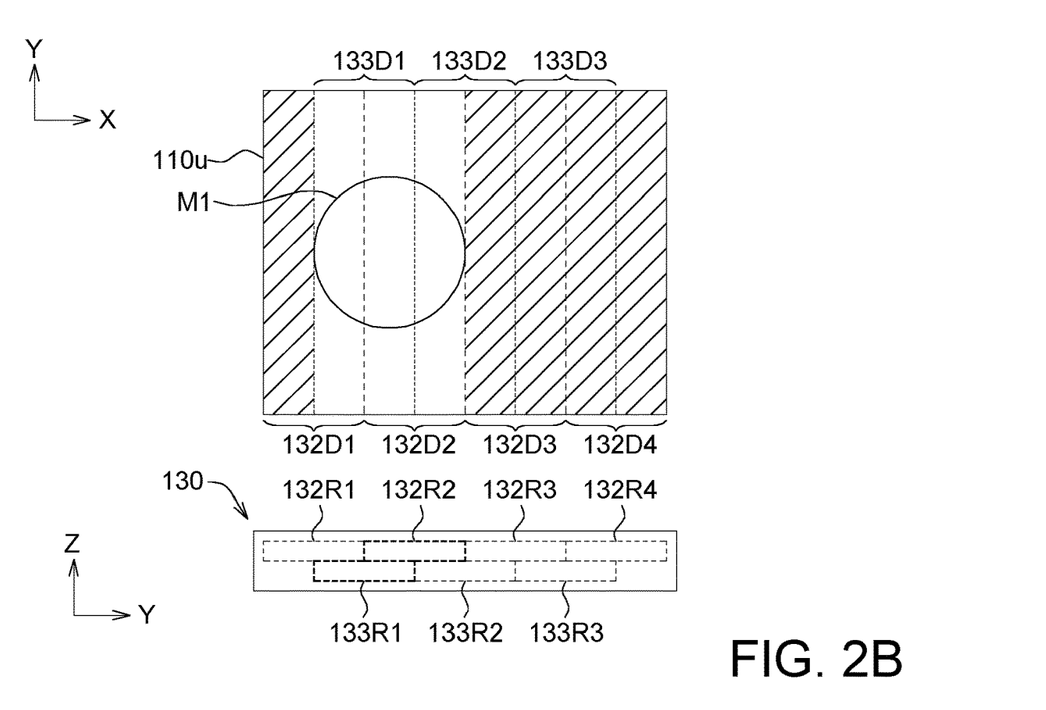
Figure 2C:
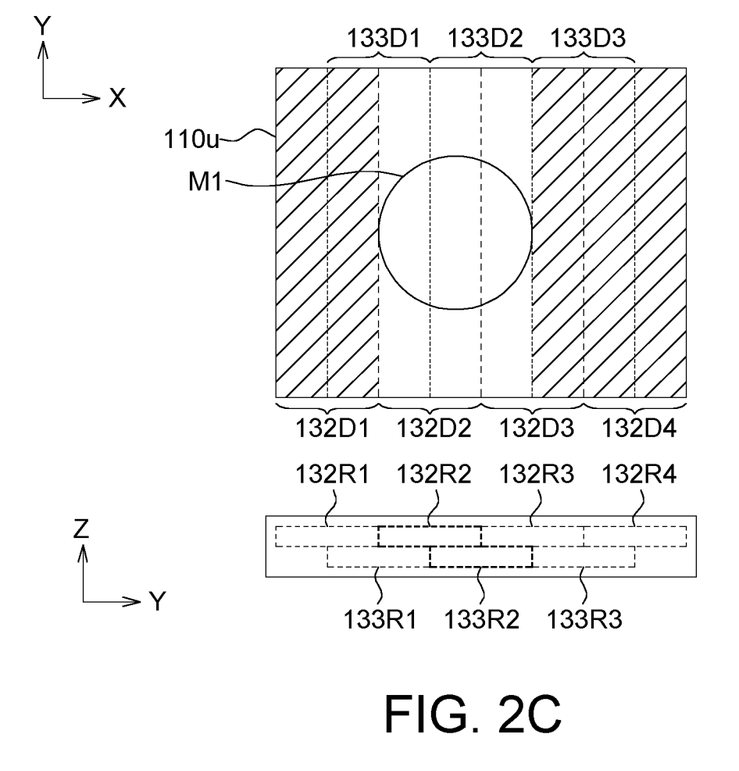

FIGS. 2A to 2C are process diagrams of an image display method of the display device 100 of FIG. 1A. The display panel 110 in each of FIGS. 2A to 2C is illustrated from a view angle perpendicular to the XY plane, and the light emitting module 130 is illustrated from a different view angle (perpendicular to the ZY plane). The process diagrams mainly describe the change of light emission in the first luminous areas and the second luminous areas of the light emitting module 130, but do not reflect actual disposition of the product.

As indicated in FIG. 2A, the display surface 110u of the display panel 110 includes a plurality of first display regions and a plurality of second display regions, wherein the first display regions include first display regions 132D1-132D4, and the second display regions include second display regions 133D1-133D3. The range of light emission on the display surface 110u from the first luminous areas 132R1-132R4 respectively correspond to the first display regions 132D1-132D4, and the range of light emission on the display surface 110u from the second luminous areas 133R1-133R3 respectively correspond to the second display regions 133D1-132D3.

As indicated in FIG. 2A, the controller 140 controls, according to the first display signal, the first luminous area 132R1 and the second luminous area 133R1 to illuminate with the first intensity. In the present embodiment, the first intensity is not equivalent to 0 (that is, illuminate). For the diagrams to be better understood, the first luminous areas and the second luminous areas that illuminate in FIG. 2A are represented by bold dotted lines, and other diagrams are illustrated according to the same principle.

The first display signal represents the first position at which the image M1 is located on the display surface 110u of the display panel 110, such as the position of the image M1 as indicated in FIG. 2A. Since only the first luminous area 132R1 and the second luminous area 133R1 illuminate but both the remaining first luminous areas 132R2-132R4 and the remaining second luminous areas 133R2-133R3 do not illuminate (display dark), the image M1 has a better contrast.

As indicated in FIG. 2B, the controller 140 controls, according to the second display signal, the first luminous areas 132R1, 132R3, 132R4 to illuminate with the second intensity (that is, control the light intensity of the first luminous areas 132R1 to change to the second intensity from the first intensity) but controls the first luminous area 132R2 to illuminate with the first intensity. The second display signal represents the second position at which the image M1 is located on the display surface 110u, such as the position of the image M1 as indicated in FIG. 2B, wherein the second position and the first position are different from each other. Since only the first luminous area 132R2 and the second luminous area 133R1 illuminate but both the remaining first luminous areas 132R1, 132R3 and 132R4 and the remaining second luminous areas 133R2-133R3 do not illuminate (display dark), a high contrast level still can be achieved even when the image M1 has dynamic changes.

As indicated in FIG. 2B, the first luminous areas 132R1 and 132R2 are adjacent to each other, the first luminous area 132R1 and the second luminous area 133R1 partially overlap along the second direction S2, and the first luminous area 132R2 and the second luminous area 133R1 partially overlap along the second direction S2.

As indicated in FIG. 2C, the controller 140 controls, according to the third display signal, the second luminous area 133R1 to illuminate with the second intensity (that is, control the light intensity of the second luminous area 133R1 to change to the second intensity from the first intensity) but controls the second luminous area 133R2 to illuminate with the first intensity. The third display signal represents the third position at which the image M1 is located on the display surface 110u, such as the position of the image M1 as indicated in FIG. 2C, wherein the third position and the second position are different from each other, and so are the third position and the first position different from each other. In FIG. 2C, the second luminous area 133R1 and the second luminous area 133R2 are adjacent to each other.

The principles of the method for controlling the luminous areas of the display image M1 are similar to that of the method disclosed above, and the similarities are not repeated here.

As disclosed above, along with the dynamic change of the image M1, the controller 140 can enhance the contrast of the image M1 displayed on the display surface 110u by controlling the first luminous areas 132R1-132R4 and the second luminous areas 133R1-133R3 to change the luminous areas. That is, the controller 140 can control some luminous areas to illuminate but control some other luminous areas not to illuminate.

Figure 3A:
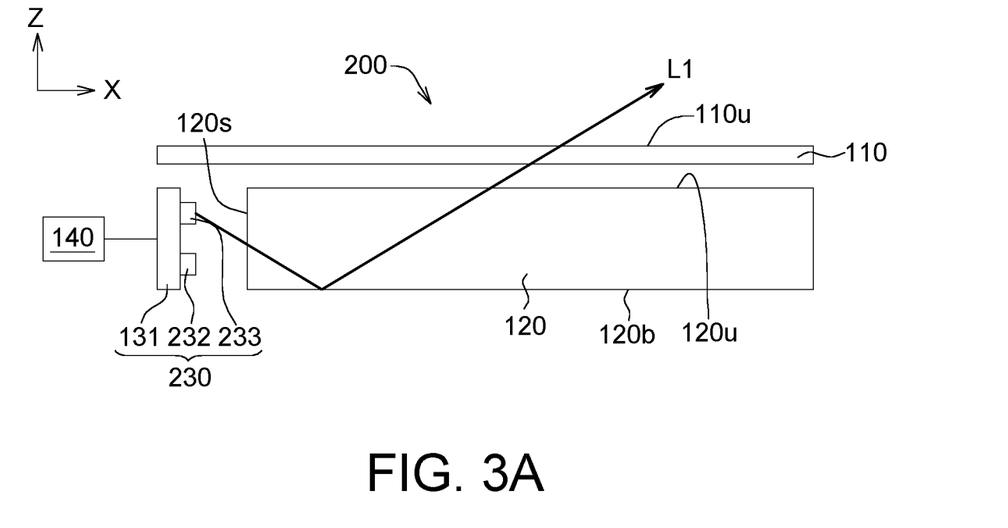
FIG. 3A is a schematic diagram of a display device according to another embodiment of the present invention.
Figure 3B:
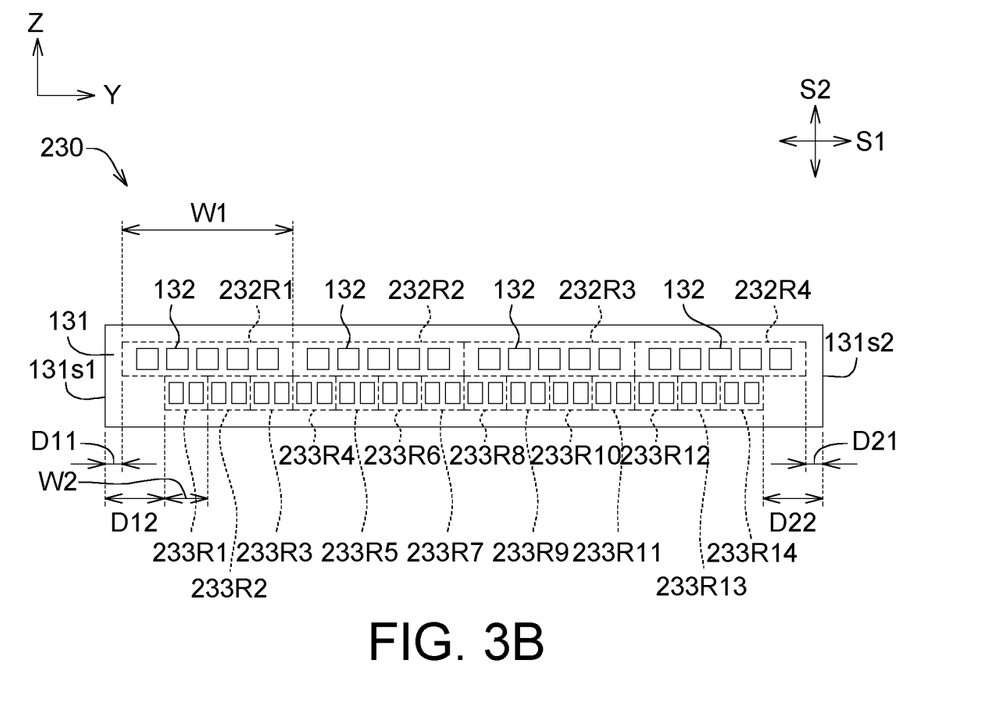
FIG. 3B is a schematic diagram of a light emitting module of the display device of FIG. 3A.

Refer to FIG. 3A-3B. FIG. 3A is a schematic diagram of a display device 200 according to another embodiment of the present invention. FIG. 3B is a schematic diagram of a light emitting module 230 of the display device 200 of FIG. 3A.

The display device 200 includes a display panel 110, a light guide plate 120, a light emitting module 230 and a controller 140. The structure of the display device 200 of the present invention embodiment is similar to that of the display device 100 except for the structure of the light emitting module 230' of the display device 200 and the image control method of the display device 200.

As indicated in FIG. 3A-3B, the light emitting module 230 includes a substrate 131, a plurality of first light emitting elements 132 and a plurality of second light emitting elements 133. The first light emitting elements 132 are disposed on the substrate 131 along a first direction S1 and are divided into a plurality of first luminous areas 232R1-232R4, wherein each of the first luminous areas includes at least two first light emitting elements 132, and the first light emitting elements 132 in the same first luminous area simultaneously illuminate or do not illuminate.

A plurality of second light emitting elements 133 are disposed on the substrate 131 along the first direction S1 and are divided into four second luminous areas 233R1-233R14, wherein each of the second luminous areas includes at least two second light emitting elements 133, and the second light emitting elements 133 in the same second luminous area simultaneously illuminate or do not illuminate.

Besides, the overall second luminous areas 233R1-233R14 and the overall first luminous areas 232R1-232R4 are staggered with each other along the second direction S2. In another embodiment as indicated in FIG. 3B, the position of the overall second luminous areas can swap with that of the overall first luminous areas. In the present embodiment, the light emitting module 130 is exemplified by two rows of luminous areas (that is, one row of luminous areas is composed of multiple first luminous areas and the other row of luminous areas is composed of multiple second luminous areas). In other embodiments, the light emitting module 130 may include more than two rows of luminous areas, wherein some rows (for example, any two rows) of luminous areas have the technical features similar to that of the first luminous areas and the second luminous areas of the present invention, or some rows of luminous areas have the technical features similar to that of the first luminous areas of the present invention and the remaining rows of luminous areas have the technical features similar to that of the second luminous areas of the present invention.

In the present embodiment, the second luminous areas 233R1-233R14 and the first luminous areas 232R1-232R4 completely overlap in the second direction S2. For example, the position between two adjacent second luminous areas of the second luminous areas 233R1-233R14 in the second direction S2 corresponds to the position between two adjacent first luminous areas of the first luminous areas 232R1-232R4. Let the second luminous areas 233R3 and 233R4 be taken for example. The position between the second luminous areas 233R3 and 233R4 corresponds to the position between the first luminous area 232R1 and 231R2 in the second direction S2 instead of partly overlapping the first luminous area 232R1 in the second direction S2 or partly overlapping the first luminous area 232 R2 in the second direction S2.

As indicated in FIG. 3B, the substrate 131 has a side 131s1, and the first interval between D11' between the side 131s1 and the first luminous area 232R1 closest to the side 131s1 among the first luminous areas is less than the second interval D12' between the side 131s1 and the second luminous area 233R1 closest to the side 131s1 among the second luminous areas. To put it in greater details, the range between the side 131s1 and the fourth luminous area 233R1 closest to the side 131s1 among the fourth luminous areas can dispense with the second light emitting elements 133, such that the required quantity of second light emitting elements 133 can be reduced, and the total quantity of light emitting elements of the light emitting module 230 can also be reduced.

Similarly, the substrate 131 has a side 131s2 opposite to the side 131s1, and the third interval D21' between the side 131s2 and the first luminous area 232R4 closest to the side 131s2 among the first luminous areas is less than the fourth interval D22' between the side 131s1 and the second luminous area 233R14 closest to the side 131s1 among the second luminous areas. To put it in greater details, the range between the side 131s1 and the second luminous area 233R14 closest to the side 131s1 among the second luminous areas can dispense with the second light emitting elements 133, such that the second light emitting elements 133 can be reduced, and the total quantity of light emitting elements of the light emitting module 230 can also be reduced.

Moreover, the length W2 of each of the second luminous areas 233R1-233R14 in the first direction S1 is less than the length W1 of each of the first luminous areas 232R1-232R4 in the first direction S1, and the second luminous areas 233R1-233R4 have a quantity greater than that of the first luminous areas 232R1-232R4. Thus, the controller 140 can display the image M1 with a smaller resolution level.

The controller 140 is configured to: (1) control at least one of the first luminous areas 232R1-232R4 to illuminate but control the other at least one of the first luminous areas 232R1-232R4 not to illuminate; (2) control multiple first light emitting elements 132 in the at least one of the first luminous areas 232R1-232R4 to illuminate simultaneously, for example, control all first light emitting elements 132 in the at least one first luminous area to illuminate simultaneously; (3) control at least one of the second luminous areas 233R1 to 233R14 to illuminate but control the other at least one of the second luminous areas 233R1-233R14 not to illuminate; (4) control multiple second light emitting elements 133 in the at least one second luminous area to illuminate simultaneously, for example, control all second light emitting elements 133 in the at least one second luminous area to illuminate simultaneously; and (5) control at least one of the first luminous area and the at least one of the second luminous area to illuminate simultaneously.

The controller 140 controls, according to the display signal, at least one of the first luminous areas 232R1-232R4 and at least one of the second luminous areas 233R1-233R14 to illuminate with the first intensity, but controls the remaining of the first luminous areas 232R1-232R4 and the remaining of the second luminous areas 233R1-233R14 to illuminate with the second intensity, wherein the at least one first luminous area and the at least one second luminous area are adjacent to each other along the first direction S1. In an embodiment, the first intensity is greater than the second intensity. For example, the first intensity refers to the light intensity not equivalent to 0, and the second intensity refers to the light intensity equivalent to 0, that is, the luminous area does not illuminate.

The processes by which the controller 140 controls image display are disclosed below with accompanying drawings FIG. 4A-FIG. 4C.

Figure 4A:
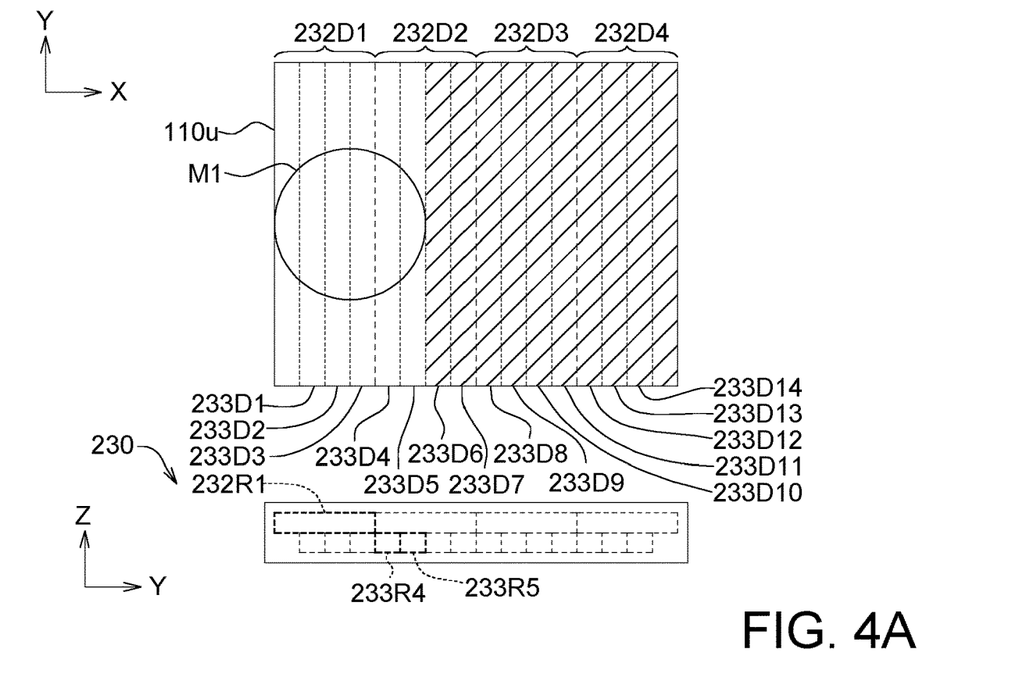
FIGS. 4A to 4C are process diagrams of an image display method of the display device of FIG. 3A.
Figure 4B:
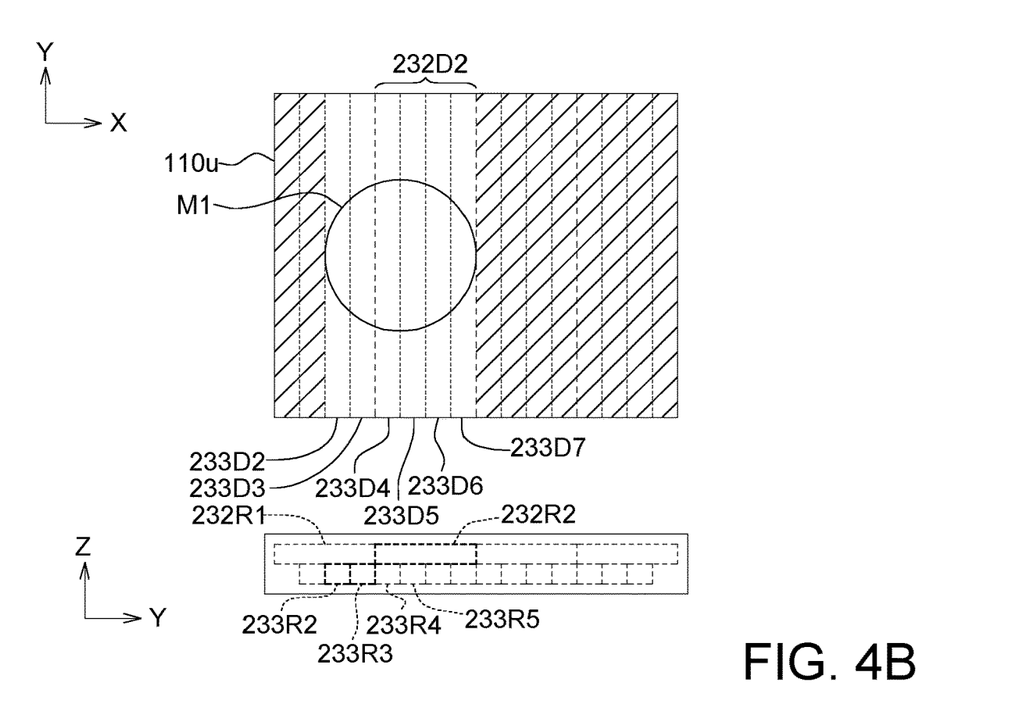
Figure 4C:
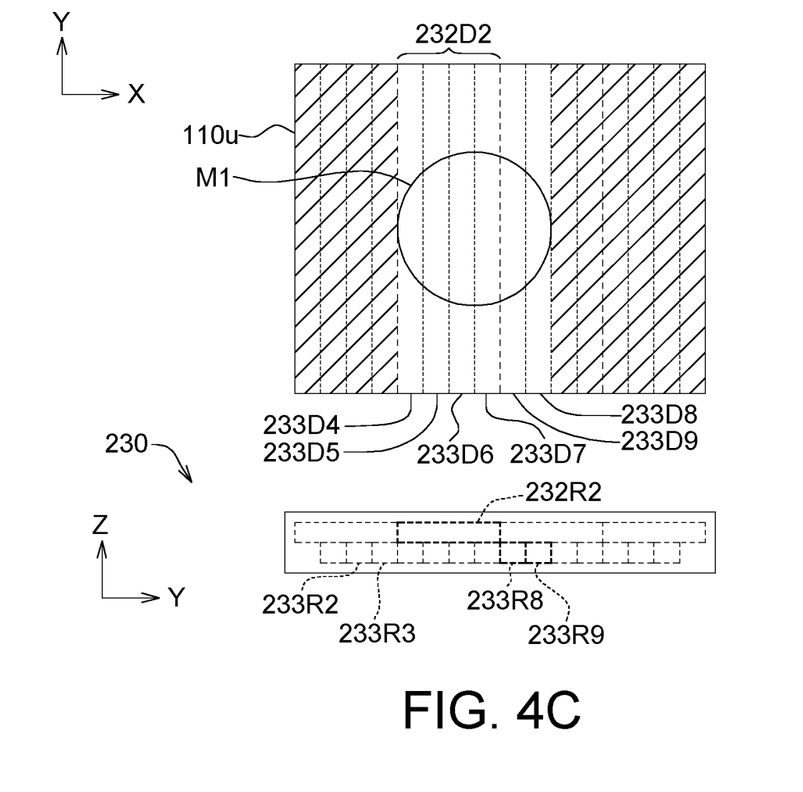

FIGS. 4A to 4C are process diagrams of an image display method of the display device 200 of FIG. 3A. The display panel 110 in each of FIG. 4A-FIG. 4C is illustrated from a view angle perpendicular to the XY plane, and the light emitting module 230 is illustrated from a different view angle (perpendicular to the ZY plane). The process diagrams mainly describe the change of light emission in the first luminous areas and the second luminous areas of the light emitting module 230, but do not reflect actual disposition of the product.

As indicated in FIG. 4A, the display surface 110u of the display panel 110 includes a plurality of third display regions and a plurality of fourth display regions, wherein the third display regions include four third display regions 232D1-232D4, and the fourth display regions include four second display regions 233D1-233D14. The range of light emission on the display surface 110u from the first luminous areas 232R1-232R4 respectively correspond to the first display regions 232D1-232D4, and the range of light emission on the display surface 110u from the second luminous areas 233R1-233R14 respectively correspond to the second display regions 233D1-232D14.

As indicated in FIG. 4A, the controller 140 controls, according to the first display signal, the first luminous area 232R1 and the second luminous areas 233R4 and 233R5 to illuminate with the first intensity. The first display signal represents the first position at which the image M1 is located on the display surface 110u of the display panel 110, such as the position of the image M1 as indicated in FIG. 4A.

Since only the first luminous area 232R1 and the second luminous areas 233R4 and 233R5 illuminate and the remaining first luminous areas 232R2-232R4 and the remaining second luminous areas 233R1-233R3 and 233R6-233R14 do not illuminate (display dark), the image M1 has a better contrast.

As indicated in FIG. 4A, the first luminous area 232R1 of the first luminous areas 232R1-232R4 and the second luminous areas 233R4 and 233R5 of second luminous areas do not overlap at all in the second direction S2. Thus, the area between the first display region 232D1 and the second display region 233R4 can have a brightness level more consistent with its surrounding.

As indicated in FIG. 4B, the controller 140 controls, according to the second display signal, the first luminous area 232R1 of first luminous areas 232R1-232R4 to illuminate with the second intensity (that is, controls the light intensity of the first luminous areas 232R1 to change to the second intensity from the first intensity, that is, controls the first luminous areas 232R1 not to illuminate) and the other first luminous area 232 R2 of the first luminous areas 232R1-232R4 to illuminate with the first intensity, but controls the second luminous areas 233R4 and 233R5 of the second luminous areas 233R1-233R14 to illuminate with the second intensity (that is, control the second luminous areas 233R4 and 233R5 of FIG. 4A to change to the second intensity from the first intensity, that is, control the second luminous areas 233R4 and 233R5 not to illuminate) and the other second luminous areas 233R2 and 233R3 of the second luminous areas 233R1-233R14 to illuminate with the first intensity. The second display signal represents the second position at which the image M1 is located on the display surface 110u, such as the position of the image M1 as indicated in FIG. 4B, wherein the second position and the first position are different from each other.

Since only the first luminous area 232 R2 and the second luminous areas 233R2 and 233R3 illuminate and the remaining first luminous area 232R1, 232R3-232R4 and the remaining second luminous areas 233R1, 233R4-233R14 do not illuminate (display dark), a high contrast level still can be achieved even when the image M1 has dynamic changes.

As indicated in FIG. 4B, the first luminous area 232R1 of the first luminous areas 232R1-232R4 and the first luminous area 232 R2 of the first luminous areas 132R1-132R4 are adjacent to each other. The first luminous area 232 R2 of the first luminous areas 232R1-232R4 and the other second luminous areas 233R2 and 233R3 of the second luminous areas 233R1-233R14 do not overlap at all in the second direction S2. Thus, the area between the first display regions 232D2 and the fourth display regions 233R3 can have a brightness level more consistent with its surrounding.

As indicated in FIG. 4C, the controller 140 controls, according to the third display signal, the other second luminous areas 233R2 to 232R3 of the second luminous areas 233R1-233R14 to illuminate with the second intensity (that is, controls the light intensity of the second luminous areas 233R2-232R3 to change to the second intensity from the first intensity, that is, controls the second luminous areas 233R2-232R3 not to illuminate) but controls the second luminous areas 233R8-232R9 of the second luminous areas 233R1-233R14 to illuminate with the first intensity. The third display signal represents the third position at which the image M1 is located on the display surface 110u, such as the position of the image M1 as indicated in FIG. 4C, wherein the third position and the second position are different from each other.

As indicated in FIG. 4C, the second luminous areas 233R2-232R3 of the second luminous areas and the second luminous areas 233R8-232R9 of the second luminous areas are not adjacent to each other. That is, the second luminous areas 233R2-232R3 and the second luminous areas 233R8-232R9 are separated by other second luminous areas. In other embodiments, the second luminous areas 233R2-232R3 of the second luminous areas and the second luminous areas 233R8-232R9 of the second luminous areas can be adjacent to each other.

The principles of the method for controlling the luminous areas of the display image M1 are similar to that of the method disclosed above, and the similarities are not repeated here.

According to the above disclosure, multiple luminous areas of the display device can be controlled to illuminate independently, and all light emitting elements in the same luminous area can be controlled to or not to illuminate simultaneously. In an embodiment, along with the dynamic change of the image, the controller can control a plurality of first luminous areas and a plurality of second luminous areas to change the luminous areas (for example, some luminous areas illuminate but some others do not) to enhance the contrast of the image displayed on the display surface. Moreover, static images can be displayed by the likes of the above display method. Additionally, the luminous areas on different rows can partly overlap along the second direction, or the position between two adjacent luminous areas on the same row corresponds to the position between two adjacent luminous areas on another row. In another embodiment, the length of each of the second luminous areas is shorter than that of the first luminous areas, and the second luminous areas have a quantity greater than that of the first luminous areas. Therefore, detailed regions of the image, such as the edge of the image, can be illuminated by controlling suitable position of the second luminous areas to illuminate.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display device comprising:
a display panel;
a light guide plate opposite to the display panel and having a light incident surface, and a light outgoing surface and a reflective surface opposite to the light outgoing surface;
a light emitting module configured to emit a light to the light incident surface, wherein the light emitting module comprises:
a substrate;
a plurality of first light emitting elements disposed on the substrate along a first direction and divided into a plurality of first luminous areas, wherein each of the first luminous areas comprises at least two first light emitting elements;
a plurality of second light emitting elements disposed on the substrate along the first direction and divided into a plurality of second luminous areas, wherein each of the second luminous areas comprises at least two second light emitting elements, and the second luminous areas and the first luminous areas are staggered with each other along a second direction perpendicular to the first direction;
wherein one of the second luminous areas and one of the first luminous areas partly overlap along the second direction;
wherein the first light emitting elements and the second light emitting elements face the light incident surface of the single light guide plate, and the light incident surface continuously extends to a light outgoing surface from the reflective surface;
wherein the first luminous areas are arranged in a distribution density different from that of the second luminous areas.

2. The display device according to claim 1, wherein a length of one of the first luminous areas along the first direction is identical to that of one of the second luminous areas along the first direction.

3. The display device according to claim 1, further comprising:
a controller configured to:
control at least one of the first luminous areas to illuminate but control at least one of the others of the first luminous areas not to illuminate; and
control the first light emitting elements in the at least one of the first luminous areas to illuminate simultaneously.

4. The display device according to claim 3, wherein the controller is further configured to:
control at least one of the second luminous areas to illuminate but control at least one of the others of the second luminous areas not to illuminate;
control the second light emitting elements in the at least one of the second luminous areas to illuminate simultaneously; and
control the at least one of the first luminous areas and the at least one of the second luminous areas to illuminate simultaneously.

5. The display device according to claim 1, wherein the substrate has a side, and a first interval between the side and the one of the first luminous areas closest to the side among the first luminous areas is less than a second interval between the side and the one of the second luminous areas closest to the side among the second luminous areas.

6. The display device according to claim 1, further comprising:
a controller configured to:
control, according to a display signal, at least one of the first luminous areas and at least one of the second luminous areas to illuminate with a first intensity, but control the others of the first luminous areas and the others of the second luminous areas to illuminate with a second intensity;
wherein the at least one of the first luminous areas and the at least one of the second luminous areas are adjacent to each other in the first direction.

7. The display device according to claim 1, further comprising:
a controller configured to:
control, according to a first display signal, at least one of the first luminous areas and at least one of the second luminous areas to illuminate with a first intensity, wherein the first display signal represents a first position at which an image is located on a display surface of the display panel;
control, according to a second display signal, the at least one of the first luminous areas to illuminate with a second intensity but control at least one of the others of the first luminous areas to illuminate with the first intensity, wherein the second display signal represents a second position at which the image is located on the second position on the display surface.

8. The display device according to claim 7, wherein the at least one of the first luminous areas and theat least one of the others of the first luminous areas are adjacent to each other, the at least one of the first luminous areas and the at least one of the second luminous areas partly overlap along the second direction, and the at least one of the others of the first luminous areas and the at least one of the second luminous areas partly overlap along the second direction.

9. The display device according to claim 7, wherein the controller is further configured to:
control, according to a third display signal, the at least one of the second luminous areas to illuminate with the second intensity but control the at least one of the others of the second luminous areas to illuminate with the first intensity, wherein the third display signal represents the third position at which the image is located on the display surface;
wherein the at least one of the second luminous areas and the at least one of the others of the second luminous areas are adjacent to each other.

10. The display device according to claim 1, wherein the the first luminous areas are arranged in a distribution density less than that of the second luminous areas.

11. A display device characterized, comprises:
a display panel;
a light guide plate opposite to the display panel and having a light incident surface, and a light outgoing surface and a reflective surface opposite to the light outgoing surface;

a light emitting module configured to emit a light to the light incident surface, wherein the light emitting module comprises:
a substrate;
a plurality of first light emitting elements disposed on the substrate along a first direction and divided into a plurality of first luminous areas, wherein each of the first luminous areas comprises at least two first light emitting elements;
a plurality of second light emitting elements disposed on the substrate along the first direction and divided into a plurality of second luminous areas, wherein each of the second luminous areas comprises at least two second light emitting elements, and the second luminous areas and the first luminous areas are staggered with each other along a second direction perpendicular to the first direction;
wherein a length of each of the second luminous areas along the first direction is less than that of each of the first luminous areas along the first direction, and the second luminous areas and the first luminous areas completely overlap along the second direction;
wherein the first light emitting elements and the second light emitting elements face the light incident surface of the single light guide plate, and the light incident surface continuously extends to a light outgoing surface from the reflective surface;
wherein the first luminous areas are arranged in a distribution density different from that of the second luminous areas.

12. The display device according to claim 11, wherein the number of the second luminous areas is greater than that of the first luminous areas.

13. The display device according to claim 11, further comprising:
a controller configured to:
control at least one of the first luminous areas to illuminate but control at least one of the others of the first luminous areas not to illuminate;
control the first light emitting elements in the at least one of the first luminous areas to illuminate simultaneously;
control at least one of the second luminous areas to illuminate but control at least one of the others of the second luminous areas not to illuminate;
control the second light emitting elements in the at least one of the second luminous areas to illuminate simultaneously; and
control the at least one of the first luminous areas and the at least one of the second luminous areas to illuminate simultaneously.

14. The display device according to claim 11, further comprising:
a controller configured to:
control, according to a display signal, at least one of the first luminous areas and at least one of the second luminous areas to illuminate with a first intensity, but control the others of the first luminous areas and the others of the second luminous areas to illuminate with a second intensity;
wherein the at least one of the first luminous areas and the at least one of the second luminous areas are adjacent to each other in the first direction.

15. The display device according to claim 11, further comprising:
a controller configured to:
control, according to a first display signal, at least one of the first luminous areas and multiple of the second luminous areas to illuminate with a first intensity, wherein the first display signal represents a first position at which an image is located on a display surface of the display panel;
control, according to a second display signal, the at least one of the first luminous areas to illuminate with a second intensity but control at least one of the others of the first luminous areas to illuminate with the first intensity;
control the at least one of the second luminous areas to illuminate with the second intensity but control at least one of the others of the second light emitting areas to illuminate with the first intensity, wherein the second display signal represents a second position at which the image is located on the second position on the display surface.

16. The display device according to claim 15, wherein the at least one of the first luminous area and the at least one of the others of the first luminous areas are adjacent to each other, the at least one of the first luminous areas and the at least one of the second luminous areas do not overlap at all along the second direction, and the at least one of the others of the first luminous areas and the at least one of the others of the second luminous areas do not overlap at all along the second direction.

17. The display device according to claim 15, wherein the controller is further configured to:
control, according to a third display signal, at least one of the others of the second light emitting areas to illuminate with the second intensity but control the others of the second light emitting areas to illuminate with the first intensity, wherein the third display signal represents the third position at which the image is located on the display surface;
wherein the at least one of the others of the first luminous areas and the at least one of the others of the second light emitting areas are not adjacent to each other.

18. The display device according to claim 11, wherein the the first luminous areas are arranged in a distribution density less than that of the second luminous areas.

19. A display device comprising:
a display panel;
a light guide plate opposite to the display panel and having a light incident surface;
a light emitting module configured to emit a light to the light incident surface, wherein the light emitting module comprises:
a substrate;
a plurality of first light emitting elements disposed on the substrate along a first direction and divided into a plurality of first luminous areas, wherein each of the first luminous areas comprises at least two first light emitting elements;
a plurality of second light emitting elements disposed on the substrate along the first direction and divided into a plurality of second luminous areas, wherein each of the second luminous areas comprises at least two second light emitting elements, and the second luminous areas and the first luminous areas are staggered with each other along a second direction perpendicular to the first direction;
wherein one of the second luminous areas and one of the first luminous areas partly overlap along the second direction;
wherein the display device further comprises:

a controller configured to:

control, according to a first display signal, at least one of the first luminous areas and at least one of the second luminous area to illuminate with a first intensity, wherein the first display signal represents a first position at which an image is located on a display surface of the display panel;

control, according to a second display signal, the at least one of the first luminous areas to illuminate with a second intensity but control at least one of the others of the first luminous areas to illuminate with the first intensity, wherein the second display signal represents a second position at which the image is located on the second position on the display surface.

20. The display device according to claim 19, wherein the at least one of the first luminous areas and the at least one of the others of the first luminous areas are adjacent to each other, the at least one of the first luminous areas and the at least one of the second luminous areas partly overlap along the second direction, and the at least one of the others of the first luminous areas and the at least one of the second luminous areas partly overlap along the second direction.

21. The display device according to claim 19, wherein the controller is further configured to:

control, according to a third display signal, the at least one of the second luminous areas to illuminate with the second intensity but control the at least one of the others of the second luminous areas to illuminate with the first intensity, wherein the third display signal represents the third position at which the image is located on the display surface;

wherein the at least one of the second luminous areas and the at least one of the others of the second luminous areas are adjacent to each other.

22. The display device according to claim 19, wherein the the first luminous areas are arranged in a distribution density different from that of the second luminous areas.

* * * * *